Figure 1:
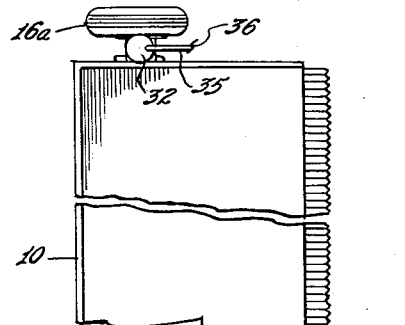

May 13, 1958 H. G. BELL 2,834,603
SELF-LEVELING WHEEL SUPPORTED DEVICE
Filed May 24, 1955

INVENTOR.
HARRY GUTHRIE BELL,
BY
Allen & Allen
ATTORNEYS.

United States Patent Office 2,834,603
Patented May 13, 1958

2,834,603

SELF-LEVELING WHEEL SUPPORTED DEVICE

Harry Guthrie Bell, Paris, Ky., assignor to Gay-Bell Corporation, Paris, Ky., a corporation of Kentucky Application May 24, 1955, Serial No. 510,778

8 Claims. (Cl. 280—6)

My invention relates to mechanism for keeping a vehicle body substantially parallel to its supporting surface even though the distance between such surface and the body is varied.

This invention is particularly applicable to farm machinery such as seed stripping devices as generally shown in the patent to Gay 2,672,004. These seed strippers generally employ a comb-like structure which is drawn through the field and which serves to strip the seed from the grain stalks. Obviously these stalks will vary in height according to differences in type and culture. Accordingly it is necessary to be able to adjust the distance that the comb structure is from the ground while at the same time maintaining the comb structure substantially parallel to the ground as desired.

In another patent to Gay 2,577,885 there is shown a body lifting device. This is also illustrated as applied to a seed stripper. In this patent there is shown a manner of applying hydraulic pressure to mechanism at one side of the stripper and providing mechanical cable means for simultaneously maintaining the other side at the same relative position from the ground. Such patent, however, does not teach a manner of preventing the comb structure from tilting with respect to the axis of the device as it is raised or lowered.

It is an important object of this invention to provide a simple arrangement by means of which a wheel supported vehicle body may be kept substantially parallel to the supporting surface without tilt thereof about the axis of such vehicle while at the same time providing means for raising and lowering the body of such vehicle with respect to the supporting surface.

Specifically, it is an object of my invention to provide an arrangement wherein the comb teeth of a seed stripper may be kept in the same relative position with respect to the ground over which the seed stripper is pulled even though the distance between the ground and the teeth is varied from time to time.

It is a further object of this invention to provide an arrangement of the type described which is economical to manufacture, simple to apply and use and which is capable of withstanding rugged use.

Although in the body of the specification to follow I shall describe this invention as applied to a seed stripper it is to be understood that such description is exemplary only and that this invention may easily be applied to any wheel supported vehicle wherein it is desired to maintain the body of such vehicle in a predetermined position with respect to the surface over which it is drawn even though the distance between such surface and vehicle body is varied.

Figure 2:
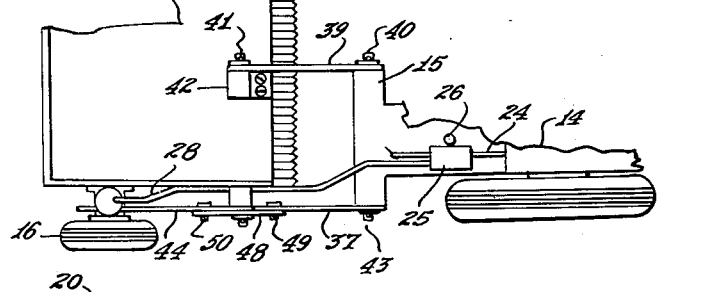

These and other objects of my invention will become apparent to those skilled in the art from an understanding of the following description and with reference to the accompanying drawings in which drawings like numerals are employed to designate like parts and in which:

Figure 1 is a plan view with parts broken away showing my invention as applied to a tractor drawn seed stripper, Figure 2 is a side elevation with parts broken away of the machinery and mechanism shown in Figure 1.

Figure 5:
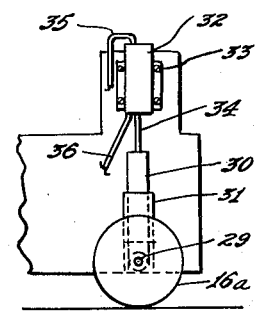
Figure 3:
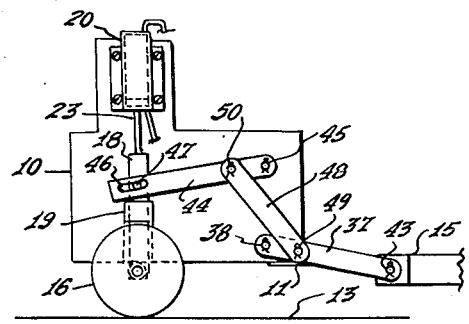
Figure 4:
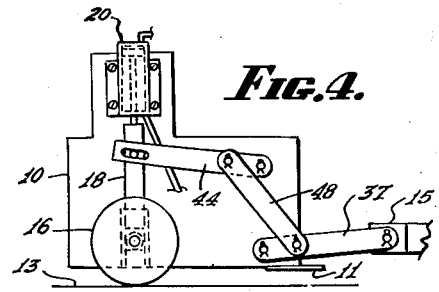

Figure 3 is a side elevation of a portion of the machinery and mechanism of Figure 2 showing a different relative position of the various operating parts, Figure 4 is a side elevation of the mechanisms of Figure 3 but showing a different relative position of such, and Figure 5 is a side elevation of a portion of the machinery and mechanism of Figure 1, which side elevation is taken from the side opposite that from which Figures 2, 3 and 4 were taken.

Attached to the vehicle body 10 is a stripping comb 11 made up of a plurality of individual teeth 12 spaced apart a distance slightly larger than the diameter of the grain stalks being stripped. The stripped seed is brought within the body 10 and taken care of by apparatus which is not shown and which does not constitute a part of this invention. Suffice to say that the problem which this invention solve is that of keeping the stripping comb 11 at the desired relative position with respect to the ground 13 even though the body 10 is moved closer to or farther from the ground as occasioned by the height of the grain stalks being stripped.

The vehicle body is shown as drawn by a tractor generally indicated at 14. Fixed to the tractor 14 is a suitable drawbar or the like 15.

The body 10 is shown as supported on a pair of wheels 16 and 16a. It will be apparent that additional wheels may be employed if desired without affecting the nature of this invention. The wheel 16 is mounted on a stub axle 17 journaled in a slide 18 operating in a track 19. A cylinder 20 is fixed to the vehicle body 10 as indicated at 21. A piston 22 reciprocable within the cylinder 20 has a rod 23 which is fixed to the slide 18. A source of fluid pressure, not shown, which may be hydraulic or pneumatic as desired, is mounted on the tractor frame or in some convenient place. A conduit 24 extends from this source to a control box 25 having an operating lever 26. A pair of conduits 27 and 28 extend from either end of the piston 20 to the control box 25.

An arrangement similar to that just described is also provided for the wheel 16a. To this end such wheel is shown as mounted on a stub axle 29 journaled in a slide 30 operating in a track 31. A cylinder 32 fixed to the body 10 as indicated at 33 is also provided. Within this cylinder is a piston which has a rod 34 fixed to the upper end of the slide 30. Conduits for the actuating fluid are shown as coupled to either end of the cylinder as indicated at 35 and 36.

The arrangement of the fluid system as tripped by actuation of the lever 26 is such that equal pressures are simultaneously applied in like manner within the cylinders 20 and 32. By this or other means (see Gay 2,577,885) both ends of the machine may be raised or lowered simultaneously. When pressure is admitted to the upper end of the cylinders 20 and 32 the piston will be forced downwardly and the body 10 thereby moved upwardly away from the ground 13. Conversely when fluid pressure is applied to the lower side of these cylinders the pistons will be moved upwardly and the body 10 downwardly to a position closer to the ground 13. If this were the only mechanism provided, however, it is true that the body 10 would move in the manner indicated but the forward portion thereof would have what may be considered a rocking motion about the axis of the stub axles 17 and 29. Thus, assuming that Figure 2 shows a more or less standard position of the parts then it would follow that when the body 10 were raised to the position of Figure 3 the teeth 12 of the stripping comb would be pointed toward the ground 13. On the other hand should the body 10 be lowered to the position of Figure 4 the points of these teeth would be directed upwardly away from the ground. It is the object of this invention, however, to maintain the stripping comb 11 in the desired relative position with respect to the ground whether the body is shown in the position of Figure 2 or whether raised or lowered to the positions of Figures 3 and 4, respectively.

In order to accomplish the object of this invention I provide further means associated with those already described as will now be particularly pointed out. Pivotally fastened to the drawbar 15 is a link 37. This member 37 is also pivotally fastened to the vehicle body 10 as indicated at 38. In order to insure smooth operation of this invention I also provide a similar link 39 pivotally fastened to the drawbar 15 as indicated at 40 and pivotally fastened to the vehicle body 10 as indicated at 41. To this end an auxiliary bracket 42 may be employed. The pivotal attachment between the link or lever 37 and the drawbar 15 is shown at 43.

There is also a lever or link 44 which is pivotally fastened to the vehicle body 10 as indicated at 45. This lever has a slot 46 which receives a pin 47 fixed to the slide 18.

One final link member is provided and this is designated by the reference numeral 48. This member 48 is pivotally fastened to the member 37 as indicated at 49 and also pivotally fastened to the member 44 as indicated at 50.

It is contemplated that this arrangement of the members 37, 48, 44 and pin 47 fixed in the slide 18 will not have to be repeated for the other side of the machinery illustrated. Provision of the additional member 39 makes the duplication of such apparatus unnecessary.

The operation of this invention may be described as follows. Considering the parts as normally in the position shown in Figure 2, should it be desired to raise the stripping comb 11 pressure will be applied to the cylinder 20 so as to force the piston 22 downwardly. The effect of moving the piston downwardly is to raise the vehicle body 10. This means that the tendency is for the points 45 and 38 to be raised also. Since the pin 47 is fixed to the slide 18 and is therefore moved downwardly with it the result may be thought of as imparting a counterclockwise movement to the member 44 about the point 45. Similarly the member 37 may be thought of as moving in a clockwise direction about the fixed point 43. The link 48 insures proper relative angular movement between the members 37 and 44 to thus maintain the stripping comb 11 substantially parallel with the ground 13.

Another way of considering the operation of this device is as follows. When the piston 22 is driven to the position of Figure 3 by proper manipulation of the handle 26 and control box 25 the slide 18 is also pushed downwardly. The pin 47 fixed to the slide 18 and engaged within the slot 46 of the member 44 serves to push the member 44 downwardly in an arcuate path about the pivot 45 as the vehicle body 10 is raised. Downward or counterclockwise movement of the member 44 also produces a downward movement of the connecting member 48. Since the member 37 is pivoted to a point 43 which cannot move the only possible reaction is for the point 38 to move upwardly. This, of course, is what is desired. Were it not for this action the rear or left portion of the vehicle body 10 would be raised while the front or right hand portion, as viewed in Figure 3, would be tilted downwardly and forwardly.

Similarly, when the piston 22 is forced to the top of the cylinder 20 the parts will assume the position shown in Figure 4. Were it not for this invention the normal thing would be for the rear or left hand portion of the vehicle body 10 to be lowered while the front or right hand portion of this body, as viewed in Figure 4, would be tilted forwardly and upwardly. By this invention, however, the front is forced down equally with the back and the stripping comb 11 thus kept parallel with the ground 13 as desired.

I find that best results are obtained with my invention when the following relationship is maintained among the various parts: The distance between the pivot points 38 and 49 divided by the distance between the pivot points 38 and 43 should substantially equal the distance between the pivot points 45 and 50 divided by the distance between the pivot points 45 and 47. This relationship, which may be expressed in formula form as follows, should be adhered to as closely as possible:

$$\frac{\Delta 38-49}{\Delta 38-43} \text{ substantially equals } \frac{\Delta 45-50}{\Delta 45-47}$$

Also I find it desirable for the connecting member 48 to be pivoted to the members 37 and 44 relatively close to the pivoted connections 38 and 45 between the members 37 and 44 and the vehicle body 10. Thus, although as will be noted from the above formula the distance between the points 45 and 50 does not have to be the same as the distance between the points 38 and 49, nevertheless the point 50 should be relatively close to the point 45 and the point 49 should be relatively close to the point 38. If the points are not so arranged too much of the required forces may be dissipated in the linkage rather than in accomplishing the intended purpose.

Best results seem to be obtained when the points 38 and 45 lie in, or nearly in, vertical alignment. It is essential that the member 44 be pivotally fastened to the vehicle body 10 at one end and to the slide 18, via the slot 46 and pin 47, at the other end. There must be the member 37 pivotally connected between the body 10 and the drawbar 15 and the connection member 48 between the members 37 and 44 is also essential. As will be noted from the formula, however, the members 37 and 44 do not have to be of the same length.

It will be understood by those skilled in the art that modifications may be made in my invention without departing from the scope and spirit thereof. Also as above pointed out, this invention may have application other than just to seed strippers and the like. And while I have shown the invention as applied to a vehicle body supported on a pair of wheels it will be obvious that the invention may be applied equally as well to bodies which are supported on more or fewer wheels. Thus, while I have shown my invention as embodied in certain structure and as applied to particular mechanisms it will be understood that I do not intend to be limited to such structure except insofar as it is specifically set forth in the subjoined claims.

Having thus described by invention, what I claim as new and what I desire to protect by way of United States Letters Patent is:

1. Apparatus for raising and lowering a tractor drawn vehicle body while maintaining same level which comprises: a first member pivotally connected to the tractor and to the vehicle body; ground engaging wheels mounted on axles journaled in slides movable in tracks fixed on the vehicle body; means fixed on said body and connected to said slides for moving them simultaneously and equally in said tracks whereby to raise and lower the body; a second member pivotally connected to said body and to one of said slides; and a link pivotally connected between said first and second members.

2. The apparatus of claim 1 in which said second member is provided with a slot, and a pin fixed to a said slide and engaged in said slot.

3. The apparatus of claim 1 in which the points at which said first and second members are pivotally connected to said body are in substantially vertical alignment.

4. The apparatus of claim 1 in which the distance between the point at which the first member is connected to the body and the point at which the link is connected to the first member divided by the distance between the point at which the first member is connected to the body and the point at which the first member is connected to the tractor is substantially equal to the distance between the point at which the second member is pivoted to the body and the point at which the link is connected to the second member divided by the distance between the point at which the second member is connected to the body and the point at which the second member is connected to said one slide.

5. The apparatus of claim 4 in which the distance between the point at which the second member is connected to the body and the point at which the link is connected to the second member, and the distance between the point at which the first member is connected to the body and the point at which the link is connected to the first member, are relatively short.

6. The apparatus of claim 1 in which there is a pair of said first members, said first members being parallel to one another.

7. Mechanism for drawing a vehicle by a tractor while maintaining a desired condition of the body with respect to the tractor which comprises: a pair of tracks fixed on said body; a slide vertically movable in each track; a wheel mounted on each slide; a cylinder fixed to said body adjacent each slide; a piston in each of said cylinders; a piston rod between each piston and its associated slide; means to raise and lower said pistons in said cylinders whereby to lower and raise respectively said body; a pin fixed to one of said slides; a first member pivotally connected to said body and to said tractor; a second member pivotally connected to said body and having a slot engaging said pin; and a connecting member pivotally connected to said first and second members.

8. The mechanism of claim 7 including an additional first member, parallel to said first-mentioned first member.

References Cited in the file of this patent

UNITED STATES PATENTS

| | | |
|---|---|---|
| 1,653,695 | Brown | Dec. 27, 1927 |
| 1,851,449 | Royal et al. | Mar. 29, 1932 |
| 2,577,885 | Gay | Dec. 11, 1951 |